3,803,274
Patented Apr. 9, 1974

3,803,274
PROCESS FOR MANUFACTURING FOAMED ELASTOMERIC MATERIALS HAVING AN INTERIOR FOAMED CELLULAR STRUCTURE COVERED WITH A NON-FOAMED SKIN LAYER

Kunihiko Nakashima, 944 Ishibata, Yoro-cho, Gifu-ken, Japan; Katsuhiko Yokoi, 3, 2-chome, Fukuhara-cho, Nagoya, Aichi-ken, Japan; and Hiroshi Fukuta, 728 Shimokayazu, Jimokuji-cho, Aichi-ken, Japan
Continuation-in-part of abandoned application Ser. No. 37,681, May 15, 1970. This application Jan. 31, 1972, Ser. No. 222,333
Claims priority, application Japan, May 15, 1969, 44/37,892, 44/37,893
Int. Cl. B29d 27/00; B29h 5/26, 7/20
U.S. Cl. 264—26         10 Claims

ABSTRACT OF THE DISCLOSURE

This invention relates to a process for manufacturing an integral article made of a single elastomeric base material having a cured, cellular interior portion and enveloped by a non-cellular skin layer which may be cured. The foamed and the non-foamed layers have a distinct and controllable boundary therebetween. The articles of the invention are manufactured by heating a foamable rubber composition, which has been formed into a desired shape, in an oven by means of a high to ultra high frequency dielectric current while the article is cooled by a fluid which is caused to flow into contact with the article.

---

This is a continuation-in-part of my copending U.S. Pat. application, Ser. No. 37,681, filed on May 15, 1970, and now abandoned.

The present invention relates generally to the manufacture of foamed elastomeric articles of rubber or plastic materials, and also to articles made therefrom which have an inner cellular structure which is covered with an outer non-foamed elastomeric skin, and wherein the article is composed of the same composition throughout. The present invention also concerns an apparatus for the manufacture of such articles.

Foamed materials are presently extensively used in the interior of automobiles, railway cars, chairs, etc. These foamed materials have an outside skin or layer made of a vinyl chloride or the like. Heretofore, these foamed materials were plasticized by plasticizing the skin layer and the foamed material separately or the skin layer was first plasticized, thereafter the foaming material was filled therein and foaming and plasticizing of the entire material was then effected.

Recently polyurethane foam materials have been made by plasticizing the skin layer and the interior of the same material simultaneously and thus forming an integrated whole. This method is advantageous in that it requires fewer process steps compared with the manufacture of foamed materials covered with a skin of poly(vinyl chloride), and also manufacturing costs are reduced considerably. However, great difficulty has been encountered when this method is applied to materials such as rubber or plastic other than polyurethane. The reason urethane polymers alone readily produce foamed materials covered with a skin layer is due to the inherent characteristics of the preparation of polyurethane wherein foaming occurred as a result of the gaseous products formed during the polymerization, which induce the interior of the urethane to react earlier than the skin layer. On the other hand, rubber sponges or plastic foamed materials which are manufactured by means of a foaming agent reach a high temperature at the skin layer first due to external heating; and hence the skin layer forms initially. The manufacture of an integral structure of a rubber composition having an interior foamed portion covered with non-foamed skin is particularly difficult since the external portion foams first. On the other hand a foamed polyurethane covered with a nonfoamed polyurethane skin has an undesirable characteristic of nonuniform cells in the foamed portion; the cell structures therein are larger in the interior section and progressively diminish in size towards the periphery of the product, up to a point where there is a very thin nonfoamed skin layer. This extremely thin nonfoamed skin layer tends to have a few small cells and does not have good weather-resistance or anti-abrasion qualities.

An object of the present invention is the provision of a simple and economic process for the manufacture of foamed elastomeric articles, i.e. non-rigid articles of natural and synthetic rubbers having an interior layer of cellular structure covered with a noncellular skin, the noncellular skin and interior cellular portion having the same composition wherein the above mentioned difficulties are avoided.

Another object of the present invention is the provision of a process for the manufacture of an integral foamed elastomeric article having an interior layer of cellular structure covered with a noncellular skin wherein the article may be of any desired shape, regular or irregular and wherein a definite boundary between the foamed interior section and unfoam skin is formed.

Still another object of the present invention is the provision of elastomeric; non-rigid integral articles of any desired shape having a uniformly foamed interior portion covered with a non-foamed skin, the article having the same composition throughout.

A still further object of the present invention is the provision of an apparatus useful for carrying out the process of the present invention and for manufacturing the articles of the present invention.

It has been discovered that integral elastomeric products such as rubber having a cellular interior portion and a non-cellular skin layer of the same composition as the interior section may be manufactured by subjecting a shaped rubber based composition containing a blowing agent to high frequency or microwave radiation in an oven while cooling the outer surface of the composition in order to develop interiorly thereof a cellular structure while maintaining an outer skin layer in a non-foamed condition whereby an article is formed which has a non-cellular skin enveloping a cellular portion of the article. The outer non-foamed skin layer may then be vulcanized or cured.

Also in accordance with the invention an apparatus useful for carrying out the process described above comprises a chamber having a constricted outlet and constricted inlet, means externally of the chamber for supplying high to ultra high frequency radiation or microwave radiation to the chamber, means defining a passageway for receiving an elastomeric article to be foamed and cured in an interior portion, thereof constructed of a non-polar or nonconductive material, means for introducing a cooling fluid to flow in said passageway into contact with said article while said article is in said passageway, effective to maintain the skin of said elastomeric article at a temperature below that at which foaming of said article occurs and means external to the chamber for aiding the withdrawal of said article from said passageway.

A foamed integral article of the present invention has the same basic structure throughout may be of any shape and has an interior portion of uniform cellular structure and a non-foamed cured outer skin enveloping the minor cellular portion. The articles are especially useful in automobiles, railway cars and chairs.

Heating of plasticizable and foamable elastomeric material causes the foaming and curing of an interior portion only because it is very selective in that it penetrates to the inner layer of the plastic material, thereby foaming the inner layer and, moreover, polymerizing, vulcanizing and setting the inner layer. During induction heating, the outer layer of the plasticizable material remains in a non-foamed condition due to the characteristics of this form of heat and due to the fact that the outer layer of the plasticizable material is cooled by contact with a cooling fluid.

The vulcanization or curing of the outer layer may thereafter be achieved by treating the outer layer at a lower temperature than that of the decomposition of the foaming agent or under a pressure higher than that resulting from the decomposition of the foaming or blowing agent. The product thus obtained consists of a non-foamed and foamed structure of the same material which has highly effective weather-resistant and anti-abrasion qualities.

It is also possible to have a continuous process in accordance with the present invention using the mixture to produce a product of any desirable length. A plasticizable material is extruded in any desired shape, thereafter the extruded material is cooled to room temperature. The material is then subjected to the radiation of a high or ultra-high frequency electric wave thereby effecting foaming, vulcanization or curing of the interior of the extruded material while the outer skin of the extruded material is kept cool and in a non-foamed state. This material can be further treated to vulcanize or cure the outer non-foamed skin layer.

The control of the non-foamed outer skin layer in the product of this invention increases the weather-resistant and anti-abrasion qualities so that water cannot penetrate into the foamed material due to the breaking of a thin outer skin surface. It is possible to control the thickness of the outer skin layer so that the thickness of the skin layer will range from about 0.5 mm. to over 10 mm. depending upon whatever use the plasticized material is to be put.

A high or ultra-high frequency electric field (1 mHz.-thousands of mHz.) is used for foaming, vulcanizing or curing the interior of the plasticizable material.

In accordance with the present invention, a plasticizable material is blended with a material capable of releasing a gas on heating, such as a chemical blowing agent, or a volatile foaming agent such as an organic solvent. This blended mixture is shaped and placed in a high or ultra-high frequency electric field (1 mHz-thousands of mHz.), whereby the foaming agent is activated by this electric field to release gas therefrom, thus foaming and curing the interior portion into a cellular structure. When the plasticizable and foamable elastomeric material is heated by high or ultra-high frequency induced electric current, the radiation of heat is less in the interior layer. The generation of heat starts first therein, foaming the interior interior into a cellular-like structure while maintaining the outer layer in a cooled condition thus establishing two separate layers, a foamed and cured inner layer and a non-foamed outer layer, even when the heat is applied to the material in an air medium.

The nature and advantages of the invention will be more fully understood from the following description of the preferred embodiments illustrated by way of examples in the accompanying drawings in which:

FIG. 5A is a cross-section view of a manufacturing apparatus for carrying out the present invention;

FIG. 5B is a cross-section view taken along section line 5B—5B of FIG. 5A;

Figure 1:
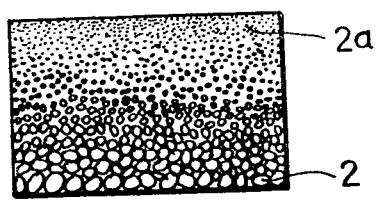
FIG. 1 is a cross-section view of a polyurethane foamed article made in accordance with the prior art.

In FIG. 1, a product prepared according to the prior art is illustrated showing in cross-section a large foamed section 2 in which the cells of the foam structure diminish in size and section 2A constituting a very thin hard outer layer which still contains some small cells.

Figure 2:
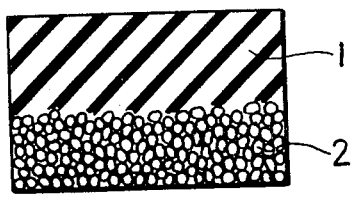
FIG. 2 is a cross-section view of a foamed article made in accordance with the present invention.

In FIG. 2, a foamed section 2 is illustrated with an outer non-foamed layer 1 showing a possible extent and width of the outer layer of a product of the invention.

The process according to the present invention will be described with reference to FIG. 2, Rubber blended with the additives usual in the art, i.e. with vulcanizing agents, vulcanization accelerators, activators, carbon black, a chemical blowing agent which releases gas by heating, and the like, is formed into a shape suitable for that of the final product. Thus formed article is put into micro-wave electric oven and exposed to a micro-wave electric field while the surface of the article is cooled by contact with a cooling fluid. The heating time is adjusted so that the inner portion of the formed product is sufficiently foamed and vulcanized, and not carbonized. By use of micro-wave dielectric heating, the radiation of heat in the interior layer is less than elsewhere, thus the interior layer is heated first. In addition, the dielectric loss tan at the heat-evolving portion of the article which is being formed by dielectric heat becomes greater, which consequently accelerates the evolution of heat in the interior layer only. Also, the outer surface is cooled by contact with a cooling fluid which induces a reduction of the heat-evolution at the outer skin layer, and thus the first-vulcanized product is formed which has a separate layer, a foamed layer 2 and non-foamed layer 1. In the inner layer, the blowing agent releases gas on heat-evolution and thus effects foaming and vulcanization.

When the polymer used is a on-polar material, such as a natural rubber, SBR (styrene, butadiene rubber), butyl rubber, butadiene rubber or the like, it is necessary to blend a polar polymer or carbon black therein, in order to accelerate the heat-evolution. For instance, when styrene butadiene rubber is vulcanized, a polar material such a nitrile butadiene rubber is vulcanized, a polar material such as nitrile butadiene rubber (NBR), chloropene rubber (CR) or the like should be blended, or else small-particled, highly active high abrasion furnace black should be included in the initial blend. Most preferably carbon black is used in amount of 20–100 parts by weight of the rubber base material.

As the blowing or foaming agent those compounds usual in the art and in general organic compounds which release gas upon being heated are used. Azodicarbonamide which produces exothermic reaction at the time of decomposition and dinitroso pentamethylene, tetramine which has a high temperature of decomposition, and which also generates heat are particularly useful in the present process. A product of especially high quality is obtained having an interior foamed section 2 with particularly uniform cells and which has a non-foamed layer 1 distinctly separated therefrom using the just mentioned preferred foaming agents. The amount of foaming agent used is that generally used in the foam art, i.e. 0.2–10 parts by weight based on the rubber base material.

The skin portion of the product resulting from exposure to dielectric heat is imperfect with respect to vulcanization, or poor in appearance, therefore, it is necessary to vulcanize, the first-vulcanized product in such a way that its skin is not foamed. In order to prevent the skin from foaming, the first-vulcanized product is heated and vulcanized at a temperature lower than that of decomposition of the blowing agent or under the pressure higher than that resulting from the decomposition of the blowing agent. The second and final vulcanization step is carried out by external heating, for example the first vulcanized product may be placed in a steam or hot air oven, subjected to heat and reformed by heated rolls or it may be heated by hot air or infra-red ray-radiation.

Figure 3:
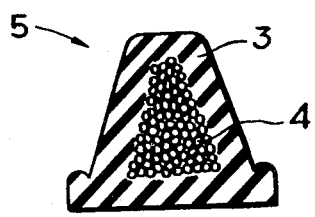
FIG. 3 is a cross-section view of one embodiment of a product according to the invention which is an elongated foamed article of complex shape covered with a non-foamed skin layer.

The article illustrated by FIG. 3 has been prepared by blending the ingredients in the ratio illustrated in the following Table 1 and then placing the mixture in an extruding machine. The blended mixture was extruded into a long element or form having a trapezoidal cross-section area with a base and height of about fifty $cm.^2$, eight cm. and eight cm. respectively. The temperature of the material within the extruding machine is kept at about 60° C. After the surface of the extruded material is cooled to room temperature, it is exposed to an ultra-high frequency induction device having a frequency of about 2450 mHz. and an output of about 300 w. for five minutes. The interior of the extruded material has an induction current induced therein and is formed and cured. The exterior, the temperature of which was raised to only about 1000° C. remains as a non-vulcanized, non-foamed, non-cellular layer 3 thereby producing the product 5.

TABLE 1

| Ingredients: | Parts by weight |
|---|---|
| Chloroprene rubber | 100 |
| Magnesium oxide | 4 |
| Zinc oxide | 5 |
| Vulcanization accelerator | 1.2 |
| Carbon black (HAF) | 20 |
| Light calcium carbonate | 10 |
| Plasticizer | 20 |
| Azodicarbon-amide | 2 |
| Stearic acid | 1 |

The thickness of a non-foamed outer skin layer 3 of the product of this process is about 8 mm. The foamed portion 4 and the skin portion 3 are distinctly separate as shown in FIG. 3. This formed first-processed product is then vulcanized in a steam oven under a pressure of about 4 $kg./cm.^2$ for about thirty minutes. The outer skin layer 3 becomes perfectly resilient, whereby the final elongated product 5 is obtained. This product is useful as a bumper for automobiles or as a ship's fender, etc. When the product is manufactured small in cross section, it can also be used as a door weather-strip for railway cars and automobiles.

Figure 4:
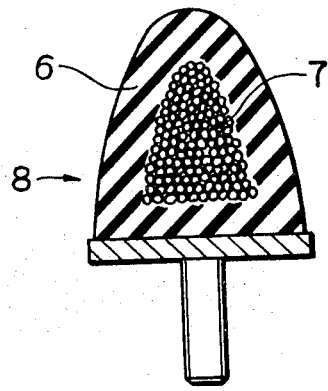
FIG. 4 is a cross-section view of still another embodiment of a product of the invention which is a rubber mounting useful as an anti-vibration device.

Referring to FIG. 4, a conicle-shaped article is shown which has been prepared by blending the ingredients as set forth in the following Table 2. The blend is formed into the desired shape and then placed and heated by means of an ultra-high frequency electric field (frequency 2450 mHz. output 300 w.) i.e. for two minutes which induces induction currents in the elastomeric material and raises the interior temperature to about 210° C. and the exterior temperature to about 130° C. thereby producing a product which is foamed, vulcanized or cured and cellular structured in the interior only. This product is put into a metallic mold and vulcanized for thirty minutes at 140° C. and thus a stopper-shaped rubber mounting 8 is produced, whose skin 6 and foamed interior portion 7 are distinctly separate as shown in FIG. 4. The vulcanization can also be carried out in a hot air or steam oven. This stopper-shaped rubber mounting 8 has an enhanced damping property, which is a desirable quality. This process is applicable to the manufacturing of such products as large-size rubber mounting, seat-cushions, head-rests, cushioning for sofas and arm-rests, foot-wear, mattresses, tubeless tires, etc., which are foamed, vulcanized or cured and cellular structured in the interior.

TABLE 2

| Ingredients: | Parts by weight |
|---|---|
| Styrene butadiene rubber | 70 |
| Acrylonitrile butadiene rubber | 30 |
| Zinc oxide | 5 |
| Stearic acid | 1 |
| Sulphur | 2.5 |
| Vulcanization accelerator | 1 |
| High-Abrasion furnace black | 60 |
| Oil | 20 |
| Di-nitroso pentamethylene tetramine | 3 |

Another example of a composition suitable for preparing the articles of the present invention is shown on Table 3:

TABLE 3

| Ingredients: | Parts by weight |
|---|---|
| Acrylonitrile butadiene rubber | 100 |
| Zinc oxide | 5 |
| Sulphur | 2 |
| Vulcanization accelerator | 1.5 |
| Stearic acid | 1 |
| High-Abrasion furnace black | 2.0 |
| Plasticizer TCP | 10 |
| Azodicarbon-amide | 2 |

In the initial step of foaming and vulcanizing an interior portion of the article in accordance with the present invention the article is placed inside a high-frequency dielectric oven, i.e. a microwave oven provided with means for cooling the surface of the article, the cooling means may be gas, such as air or carbon dioxide or any gas such as nitrogen, or a liquid such as water polyethylene glycol, diphenyl chloride or triphenyl chloride. The liquid cooling means maybe any inert liquid providing it has a boiling point below the decomposition temperature of the foaming agent. By inert is meant that liquid should not swell, dissolve, contaminate, or react with the rubber composition or cause it to deteriorate in any way, This process has the advantage of making it possible to adjust the thickness of the skin. When cooling by gas, it is only necessary to blow liquid carbon-dioxide or cooled air into the oven. The use of a liquid cooling means provides a particularly distinct skin layer, however, when a liquid cooling medium is used, some measures must be taken so that the liquid will not spill and to minimize the quality of liquid used, since it is capable of absorbing the electric wave.

The frequency of the current used to effect the foaming and curing in the interior portion of the article is that which can be supplied by a magnetron, the usual source of current for a high frequency electric heating oven or more commonly referred to as a microwave oven. In general, frequencies in the range of about 300 to 30,000 mHz., are used in connection with microwave ovens.

Figures 5A, 5B:
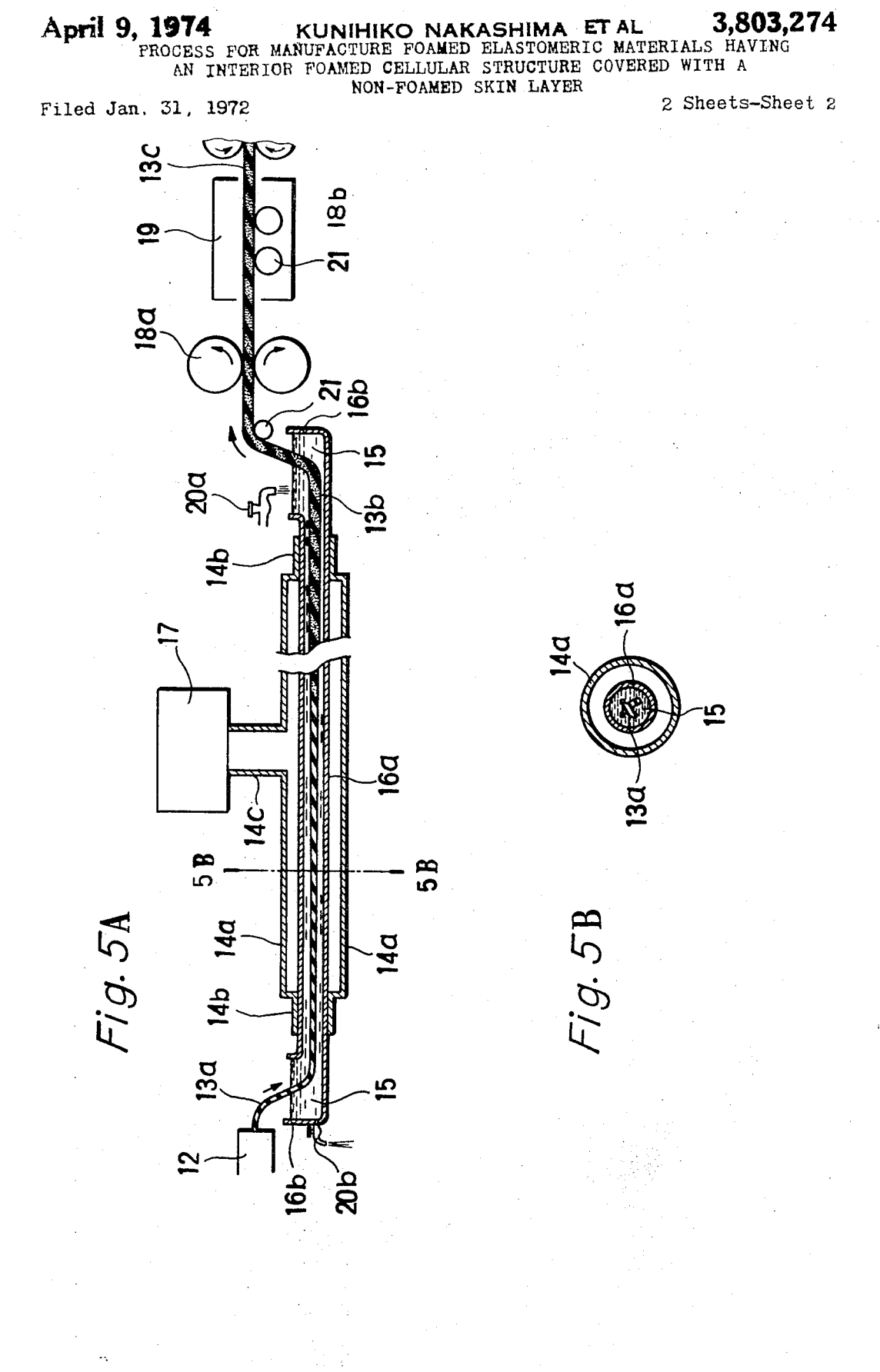

The apparatus shown in FIG. 5A illustrates a device in which the process of the invention may be carried out. The device has a tube 16a made of non-polar material such as glass, ceramics or the like installed within a high-frequency electric tubular induction heating oven 14a, which is filled with a liquid cooling medium 15. The oven 14a is connected to a magnetron 17 by an electric wave conduit or guide, 14c, i.e. the oven 14a is a microwave oven. The tubular induction heating device has a reduced diameter at the inlet and at the outlet for the material as indicated in 14b so as not to allow leakage of the electric wave. The tubular device 16a has two end tanks 16b which make it easier to set extruded rubber material 13a extruded, from an extruder 12, in the liquid and to control the concentration and the temperature of the liquid. Control of the temperature of the cooling liquid is performed by using various kinds of liquid or by adjusting the quantity and temperature of the liquid passing through the inlet 20a and the drain 20b.

The treated material 13a is further treated to improve the outer skin layer by advancing longitudinally under control of two sets of pulling rollers 18a and 18b over guide rollers 21 through a secondary oven 19 so that the treated non-foamed, non-cellular material 13c has a vulcanized or cured outer skin layer as later explained.

Several advantages result from the use of the apparatus illustrated in FIG. 5A.

By using a pipe in this apparatus made of non-polar material, the quantity of liquid required within the oven is minimized. If a large amount of liquid is used in the oven the electric wave would be absorbed only in the liquid, thus heating the liquid instead of the interior layer of the placticizable and foamable elastomeric material.

In this apparatus, the electric wave emitted in the oven is strongest in the central part and weakest in the peripheral parts of the oven. Accordingly, if the liquid occupies the bottom of the oven the placticizable and foamable elastomeric material will not be effectively inductively heated.

It has been found that the foamed inner layer (cellular structured) can be controlled to rise to the upper surface, which is peripherally cooled, thus the entire peripheral surface which forms the outer skin layer may be readily controlled resulting in a product having superior skin quality.

Moreover, it has been found that the elastomeric material can be pulled out by means pulling rollers without use of a belt-conveyor within the oven. In conventional well-known apparatuses, a belt-conveyor is a necessity being required to move the extruded material. The conveyor is exposed to high temperatures which shorten its life. This problem is not encountered by the apparatus of the invention. The fluid cooling medium 15 can be a gas or a liquid, such as water or low-boiling-point polyethylene glycol whose boiling point is lower than the decomposition temperature of the foaming agent or a liquid such as diphenylchloride or triphenylchloride whose dielectric loss is small. The movement of the article through the passageway in the oven may be aided by the buoyancy or flow of the fluid cooling medium therein.

Figure 6A:
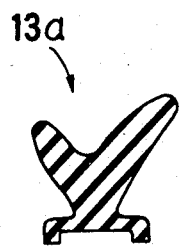
FIG. 6A is a cross-section view of a plasticizable material not vulcanized.
Figure 6B:
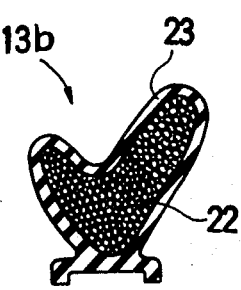
FIG. 6B is a cross-section view of a product of the invention having a complex shape whose interior alone is foamed and cured.
Figure 6C:
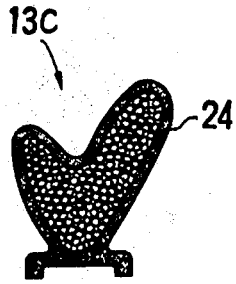
FIG. 6C is a cross-section view of a product according to the invention illustrating a product of complex shape in which the skin portion has been vulcanized or cured while the formation of the foam in the skin has been suppressed.

The elastomeric material 13a, illustrated in FIG. 6A, is extruded through an extruding machine 12 as above described and is in a non-foamed or non-cellular state. It is then passed through an ultra-high frequency electric field i.e. through the microwave oven illustration in FIG. 5A, and the interior layer 22 is thereby foamed and vulcanized or cured in the interior only as shown at 13b, FIG. 6B, while a skin layer 23 remains in a non-foamed or non-cellular state. The thickness of the skin layer can be optionally controlled by adjusting the output of the magnetron 17, the quantity of the liquid filled in the tube within the oven, or controlling the temperature of the liquid by means of the inlet cock 20a and outlet cock 20b. Thus, the internally foamed cellular material 13b whose skin layer is in a non-foamed, non-cellular state is delivered to the secondary heating oven 19, shown in FIG. 5A, wherein the outer skin is vulcanized or cured as shown at 24 in FIG. 6C, resulting in the formation of the final product. It must be noted that in order to vulcanize or cure the skin layer of the treated elastomeric material, without foaming it, the temperature of the secondary heating oven 19 must be kept lower than that of the decomposition of the foaming agent.

While preferred embodiments of the invention have been illustrated in the drawings and particularly described, it will be understood that the invention is in no way limited to these embodiments. Thus while a particular wave frequency has been used for microwave heating in the illustrative examples, it is evident that other frequencies in the range generally supplied to microwave ovens may be used as well. For example, frequencies of 915 mHz. and 5850 mHz. have been used with the same results as obtained with the frequency 2450 used on the specific examples.

What we claim is:

1. A method of manufacturing a non-rigid integral foamed article having an inner portion of cellular structure and a non-cellular skin of the same material enveloping the inner cellular portion comprising:
    (a) preparing a shaped article from a foamable mixture composed of
        a base material selected from a member of the group consisting of natural rubber, chloroprene rubber, styrene, butadiene rubber, ethylene-propylene rubber and acrylonitrile butadiene rubber,
        a foaming agent which releases a gas upon being heated and
        carbon black.
    (b) placing said shaped article into a microwave oven,
    (c) feeding a cooling fluid into said oven and then into contact with the entire surface of said article to maintain the surface of said article at a temperature below the temperature at which said foaming agent releases gas,
    (d) curing and foaming the interior section of said shaped article by microwave heating in said oven while said surface of said article is maintained at a temperature below the temperature at which the foaming agent releases gas by contact with said cooling fluid whereby a product having an internal cellular structure completely covered by a non-foamed and non-vulcanized skin layer is obtained, and
    vulcanizing said outer skin layer by external heat while suppressing the release of gas of said foaming agent.

2. A process according to claim 1 in which the foaming agent is dinitrosopentamethylene tetramine or azodicarbonamide.

3. A process according to claim 1 in which said foaming agent is dinitrosopentamethylene tetramine or azodicarbonamide and said cooling fluid is selected from liquids having a boiling point below the decomposition temperature of the foaming agent consisting of water, polyethylene glycol, diphenyl chloride and triphenyl chloride.

4. A process according to claim 1 in which said cooling fluid is selected from at least one member of the group consisting of air, nitrogen, and carbon dioxide.

5. A process according to claim 1 in which the carbon black is present in an amount of about 20 to 100 parts by weight based on the weight of said base material.

6. A process according to claim 1 in which the carbon black is present in an amount of about 20 to 60 parts by weight based on the weight of said base material.

7. A method according to claim 1 in which said oven is provided interiorly with an elongated container of non-conductive material filled with cooling fluid and adapted to form a path along which said shaped article travels.

8. A process according to claim 1 in which the vulcanization of said outer skin is carried out at a tempterature below which said foaming agent releases said gas.

9. A process according to claim 8 in which said vulcanization of said outer skin is carried out by heating said article with steam, hot air or infrared radiation.

10. A process according to claim 1 in which said vulcanization of said outer skin is carried outer under a pressure higher than the pressure resulting from the decomposition of said foaming agent.

References Cited

UNITED STATES PATENTS

| | | | |
|---|---|---|---|
| 2,333,143 | 11/1943 | Bennett | 264—26 |
| 2,463,289 | 3/1949 | Leguillon | 264—26 |
| 3,345,439 | 10/1967 | Everard et al. | 264—26 |
| 3,639,190 | 2/1972 | Brooke et al. | 264—26 X |

PHILIP E. ANDERSON, Primary Examiner

U.S. Cl. X.R.

161—160, 161, 166; 264—45, 47, 52, 54, 201, 236, 237, 321, DIG. 5, DIG. 14; 425—71, 174, 378